Inventor
NELSON HECTOR KENT

Patented Apr. 14, 1953

2,634,581

UNITED STATES PATENT OFFICE 2,634,581

SEPARATE BURNER SYSTEM FOR DEICING THE INLETS OF MULTIPLE GAS TURBINE UNITS

Nelson Hector Kent, Allestree, England, assignor to Rolls-Royce Limited, Derby, England, a British company Application August 23, 1948, Serial No. 45,751
In Great Britain August 27, 1947

2 Claims. (Cl. 60—39.09)

1

This invention relates to gas-turbine powerplant installations and is concerned with means for preventing the formation of ice or for removing ice if formed on such installations and parts associated therewith. A particular application of the invention is to aircraft powerplant installations in which ice accretions are liable to occur.

The main object of this invention is to provide a power plant which has a plurality of gas-turbine engines located side by side and means for de-icing the air intakes of all the gas-turbine engines even though one or more of them is shut down.

There will now be described a number of arrangements of a gas-turbine engine having means for injecting hot gas into the inlet of the compressor of the engine for anti-icing purposes.

Figure 1:
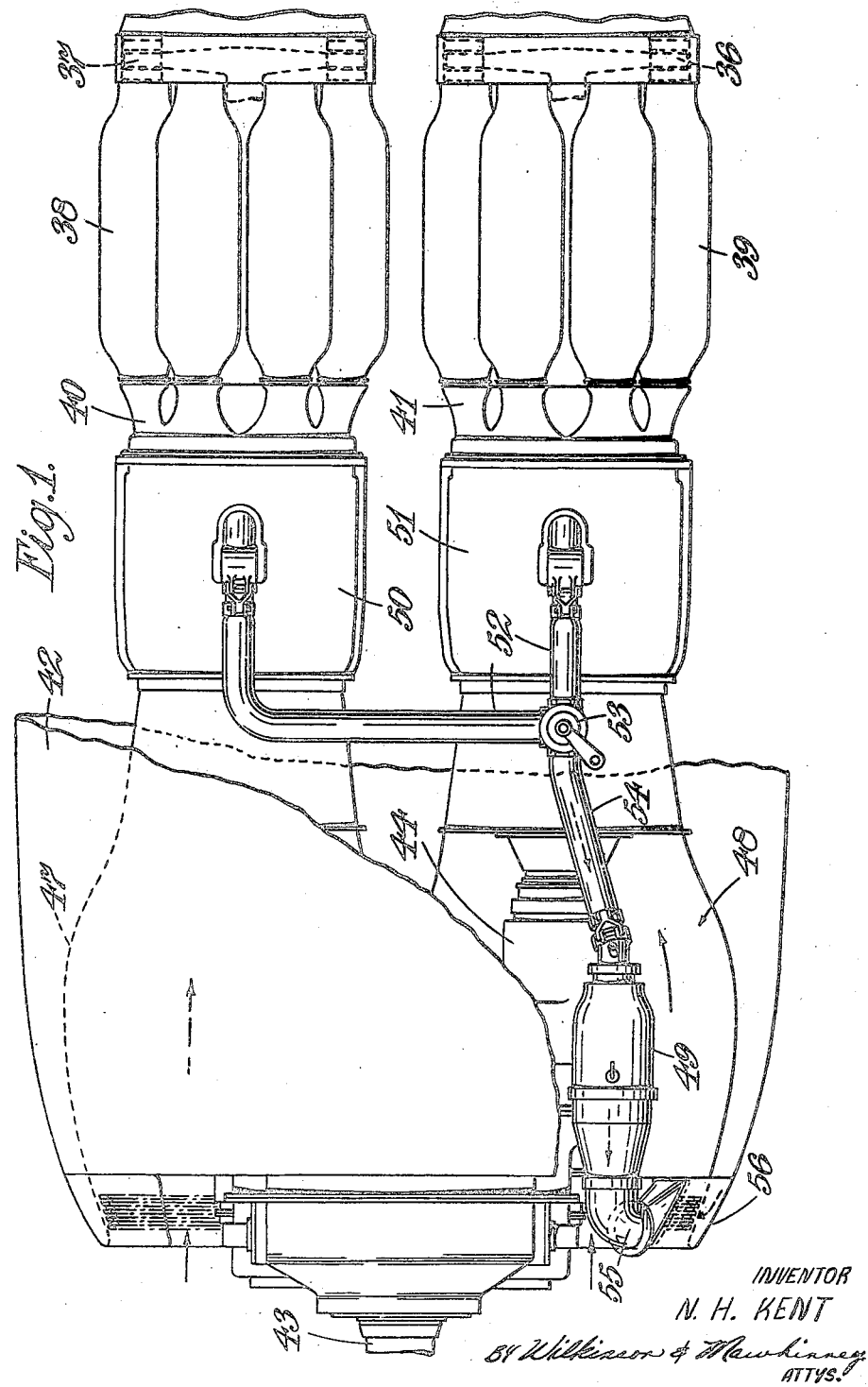
Figure 2:
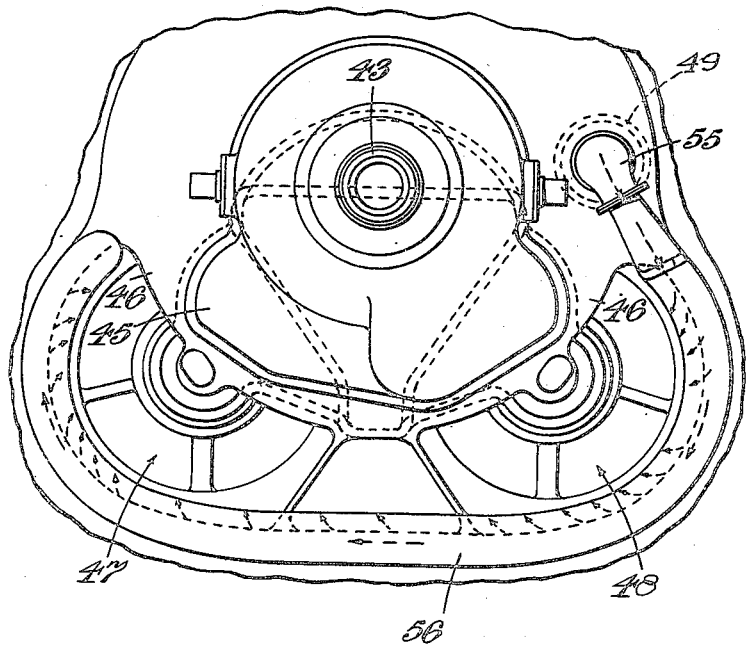

One embodiment of the invention will now be described with reference to the accompanying drawings in which:

Figure 1 illustrates the application of the invention to a power plant having coupled gas-turbine engines arranged to drive an airscrew, the view being a plan partly broken away, and Figure 2 is a front elevation of Figure 1.

In Figures 1 and 2 there is shown a pair of gas-turbine engines 40, 41 disposed side by side within a nacelle 42 and arranged to drive a propeller shaft 43 located at the forward end of the nacelle 42 through reduction gearing 44 and coupling gearing housed in a casing 45. One engine, as seen in Figure 1, comprises a compressor 50 which delivers to the main combustion equipment 38 and a turbine 37, and the other engine comprises a compressor 51, main combustion equipment 39 and a turbine 36. In both engines the compressor, main combustion equipment and turbine are traversed in turn by the working fluid.

As best seen in Figure 2, the forward ends of the driving shafts of the engines are supported from webs 46 extending from the casing 45 partially over the air-intakes 47, 48 of the two engines. Rearwardly of the webs, the air intakes will be of generally annular form and will be suitably shaped according to the desired flow characteristics in the air-intakes.

Under certain operating conditions of the engine when employed for aircraft propulsion, ice may form on and accumulate on the inlets to the compressors and also on the compressor blading and this invention has for an object to provide improved means for reducing such ice formation or to prevent its formation.

2

In this embodiment of the invention, hot gas is injected into the air-intake to heat the air flowing in the intake thereby to reduce or prevent ice formation, and the hot gas is produced in the following manner from a combustion chamber 49 separate from the main combustion equipments 38, 39 respectively of the engines 40, 41.

As best seen in Figure 1, the combustion chamber 49 is located outside one of the engines adjacent the forward end of the air-intake thereto and close to the propeller shaft 43 and coupling gearing casing 45. The air for burning the fuel in the combustion chamber 49 may be abstracted from any convenient point in the engine, and, in this embodiment, it is abstracted from the compressors 50, 51 of the engines through ducts 52 leading to the valve 53. The valve 53 is so arranged that the air can be abstracted either from the compressor 50 and/or from the compressor 51 or so that the supply of air can be cut-off. The air flowing through the valve 53 passes into a duct 54 leading to the inlet neck of the combustion chamber 49. Fuel will supplied to the combustion chamber 49 in the usual way and a spark plug device will also be provided to initiate combustion within the combustion chamber 49. Conveniently, the supply of fuel and the high tension supply to the spark plug device, and the valve 53 will be arranged for simultaneous operation so that hot gas can be supplied to the air-intake 47, 48 as desired.

As seen in Figure 2, the outlet end of the combustion chamber 49 is provided with a nozzle 55 delivering into a manifold 56 which extends from the nozzle 55 around the outer edge of the inlet opening to the air-intake 48 along the lower leading edge of the nacelle 42 and then upwardly around the outer portion of the inlet opening to the air-intake 47. The manifold 56 in effect forms a part of the boundary wall of the common inlet to the two air-intakes.

The inwardly facing wall of the manifold 56 will be perforated to allow the hot gas entering it to flow out from it into the two air-intakes.

It will be seen that with this construction hot gas can be supplied to both engines even though one of them is not running, so that if one engine fails when flying under icing conditions, hot gas is supplied to the leading portion of its air-intake to heat it, the necessary combustion air being abstracted from the other engine.

I claim:

1. A power plant installation comprising the combination with a plurality of gas-turbine engines located side by side, each having a compressor, combustion equipment and a turbine traversed in turn by working fluid, and each having an air-intake structure leading to the compressor thereof, of means for delivering hot gas to said air-intake structures comprising a combustion chamber located exteriorly of said air-intake structures adjacent the forward end thereof, conduits one for each of said engines to abstract compressed air therefrom, a common manifold to which said conduits deliver and connected to supply said combustion chamber, valve means to enable any of said conduits to be closed off from the common manifold, fuel supply means for said combustion chamber, and distributing means to distribute hot gas from said combustion chamber into each of said air-intake structures.

2. A power plant as claimed in claim 1, further comprising an air-inlet duct common to said air-intake structures and wherein said distributing means comprise a manifold forming part at least of the boundary of said air-inlet duct, said manifold having hot gas outlets to permit hot gas to flow into said air-inlet duct.

NELSON HECTOR KENT.

References Cited in the file of this patent

UNITED STATES PATENTS

| Number | Name | Date |
|---|---|---|
| 1,924,122 | Jones | Aug. 29, 1933 |
| 2,393,792 | McCollum | Jan. 29, 1946 |
| 2,404,275 | Clark et al. | July 16, 1946 |
| 2,409,177 | Allen | Oct. 15, 1946 |
| 2,411,227 | Planiol | Nov. 19, 1946 |
| 2,425,630 | McCollum | Aug. 12, 1947 |
| 2,469,375 | Flagle | May 10, 1949 |
| 2,474,068 | Sammons | June 21, 1949 |
| 2,482,720 | Sammons | Sept. 20, 1949 |
| 2,510,170 | Chillson | June 6, 1950 |
| 2,529,102 | Palmatier | Nov. 7, 1950 |
| 2,529,103 | Palmatier | Nov. 7, 1950 |

FOREIGN PATENTS

| Number | Country | Date |
|---|---|---|
| 871,408 | France | Jan. 15, 1942 |